2 Sheets--Sheet 1.

W. B. MITCHELL.
Car-Couplings.

No. 145,584.  Patented Dec. 16, 1873.

Witnesses  
Jno. H. Whipple  
Jas. A. Cowles

Inventor.  
Walter B. Mitchell

AM. PHOTO-LITHOGRAPHIC Co.N.Y.(OSBORNE'S PROCESS)

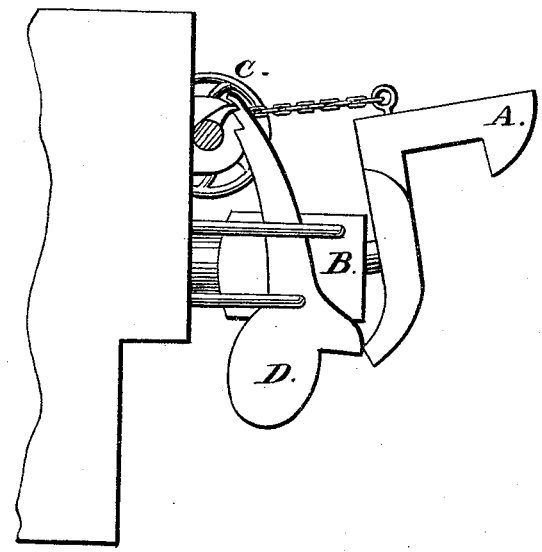

UNITED STATES PATENT OFFICE.

WALTER B. MITCHELL, OF CHICAGO, ILLINOIS.

IMPROVEMENT IN CAR-COUPLINGS.

Specification forming part of Letters Patent No. 145,584, dated December 16, 1873; application filed June 21, 1873.

*To all whom it may concern:*

Be it known that I, WALTER B. MITCHELL, of Chicago, in Cook county and State of Illinois, have invented an Adjustable Car-Coupling, of which the following is a specification:

The object of my invention is to form a reliable car-coupling, which will couple cars automatically on their coming together on the track, and which may be uncoupled without going between the cars. It consists of two similar parts or couplings, so constructed that they may be attached to the ordinary bumper, now in general use on freight and passenger cars, by means of the coupling-pin, and is intended to take the place of the link in general use for coupling cars.

Figure 1:
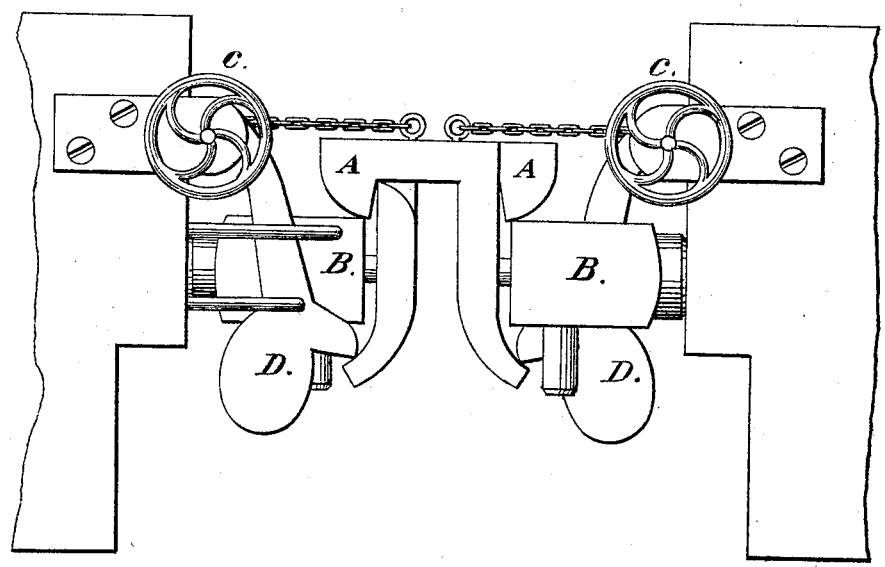
Figure 2:
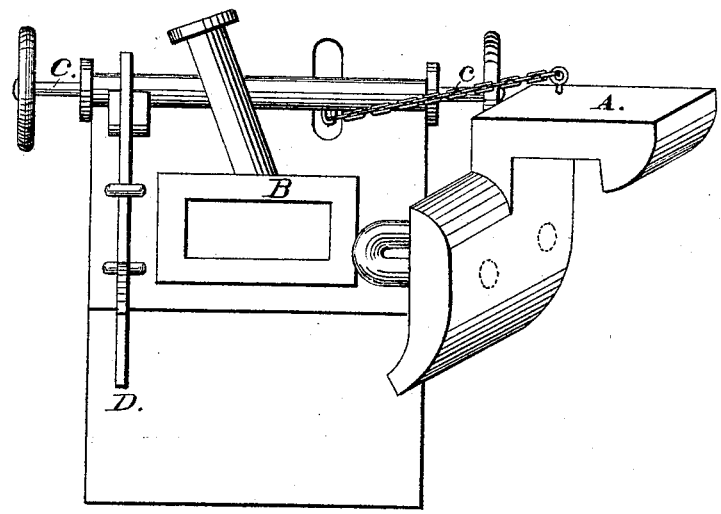

My invention is illustrated in detail in the side view, Figure 1, the end view, Fig. 2, and a side view, partly in section, Fig. 3, of the drawings; in which A A are the adjustable couplings, B is the bumper, C, the rod or shaft, with cam and chain attached for uncoupling, and D the ratchet or pawl, which engages with the cam on shaft C to hold the adjustable couplings in position when uncoupled. The couplings have half-links or staples fixed firmly to them, and are attached to the bumpers by inserting the half-links or staples into the bumpers and putting in the pin. When the car is uncoupled the coupling is held in an elevated position by the chain wound around the shaft and secured by the ratchet or pawl. On the cars coming together, the bottom parts of the couplings strike together and are forced back against the bottom of the ratchets or pawls, which causes them to relieve the couplings, and permit them to drop down together and lock. In uncoupling, when the chain is wound around the shaft, it elevates the coupling and releases its contact with the ratchet or pawl, which is so weighted at its lower end that it will engage with the cam on the shaft by force of its own gravity, when released, and hold the coupling in an elevated position.

I claim as my invention—

1. The coupling-hook A, having a link projecting from its rear, and capable of attachment to the draw-head B, as set forth.

2. The combination of the coupling-hook A, chain c, shaft C, and pawl D, as and for the purpose set forth.

WALTER B. MITCHELL.

Witnesses:
 JNO. H. WHIPPLE,
 JAS. A. COWLES.